United States Patent
Kobori et al.

(10) Patent No.: US 7,994,973 B2
(45) Date of Patent: Aug. 9, 2011

(54) MOVING BODY POSITIONING DEVICE

(75) Inventors: Norimasa Kobori, Toyota (JP); Naoto Hasegawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 289 days.

(21) Appl. No.: 12/377,400

(22) PCT Filed: Nov. 26, 2007

(86) PCT No.: PCT/JP2007/072776
§ 371 (c)(1),
(2), (4) Date: Feb. 13, 2009

(87) PCT Pub. No.: WO2008/072463
PCT Pub. Date: Jun. 19, 2008

(65) Prior Publication Data
US 2010/0225536 A1   Sep. 9, 2010

(30) Foreign Application Priority Data
Dec. 11, 2006   (JP) .................................. 2006-333675

(51) Int. Cl.
*G01S 19/07*   (2010.01)
(52) U.S. Cl. .................................. 342/357.44
(58) Field of Classification Search .............. 342/357.44
See application file for complete search history.

(56) References Cited

U.S. PATENT DOCUMENTS

| | | | |
|---|---|---|---|
| 5,323,322 A * | 6/1994 | Mueller et al. | 701/215 |
| 5,943,629 A * | 8/1999 | Ballard et al. | 702/2 |
| 6,407,700 B1 * | 6/2002 | Giffard | 342/357.25 |
| 6,531,981 B1 * | 3/2003 | Fuller et al. | 342/357.48 |
| 7,289,061 B2 * | 10/2007 | Komjathy et al. | 342/357.31 |
| 2006/0164297 A1 | 7/2006 | Hernandez-Pajares et al. | |
| 2006/0262010 A1 | 11/2006 | Sato | |

FOREIGN PATENT DOCUMENTS

| | | |
|---|---|---|
| JP | 7 198821 | 8/1995 |
| JP | 2002 318271 | 10/2002 |

(Continued)

OTHER PUBLICATIONS

Hugentobler, U. et al., "Code IGS Analysis Center Technical Report 2000" (2000).
Blanch, J. et al., "A New Ionospheric Estimation Algorithm for SBAS Combining Kriging and Tomography", ION NTM 2004, pp. 524-529 (2004).
Beran, T. et al., "Evaluation of High-Precision, Single-Frequency GPS Point Positioning Models", ION GNSS 2004, pp. 1893-1901 (2004).

(Continued)

*Primary Examiner* — Thomas H Tarcza
*Assistant Examiner* — Frank McGue
(74) *Attorney, Agent, or Firm* — Oblon, Spivak, McClelland, Maier & Neustadt, L.L.P.

(57) ABSTRACT

A disclosed vehicle control device includes a first ionospheric state information receiving unit receiving information of a predicted ionospheric state at a time point later than a current time point; a second ionospheric state information receiving unit receiving information of an ionospheric state at the current time point; an ionospheric delay error estimating unit estimating an ionospheric delay error by correcting a first ionospheric delay error based on a second ionospheric delay error, the first ionospheric delay error being derived based on the first ionospheric state information, and the second ionospheric delay error being derived based on the second ionospheric state information; and a positioning unit locating a position of a moving body based on a receiving result of a radio wave from a satellite and the estimated ionospheric delay error.

7 Claims, 5 Drawing Sheets

FOREIGN PATENT DOCUMENTS

| | | |
|---|---|---|
| JP | 2005 77291 | 3/2005 |
| JP | 2005 517931 | 6/2005 |
| JP | 2006 510893 | 3/2006 |
| JP | 2006 349672 | 12/2006 |
| JP | 2007 187592 | 7/2007 |

OTHER PUBLICATIONS

Gao, Y. et al., "Precise Ionosphere Modeling Using Regional GPS Network Data", Journal of Global Positioning Systems, vol. 1, No. 1, pp. 18-24 (2002).

* cited by examiner

WORLD COORDINATE SYSTEM
AND LOCAL COORDINATE SYSTEM

MOVING BODY POSITIONING DEVICE

TECHNICAL FIELD

The present invention relates to a moving body positioning device for positioning a moving body by appropriately estimating an ionospheric delay error.

BACKGROUND ART

Conventionally, there is a known technique for a satellite positioning system including a GPS receiver and a GPS server. In the technique, the GPS server receives ionospheric information intermittently transmitted based on events in the ionospheric layer such as sunrise, noon, and sunset, creates an ionospheric model, estimates Ionospheric error, and supplies the information of the estimated ionospheric error to the GPS receiver (see, for example, Patent Document 1).

Patent Document 1: Japanese Patent Application Publication No. 2005-517931.

DISCLOSURE OF THE INVENTION

Problem to be Solved by the Invention

On the other hand, various information items of ionospheric conditions for estimating the ionospheric error (such as a correction coefficient, an ionospheric model, and total electron content in the ionospheric layer) are available now. However, no proposal capable of appropriately utilizing the information by taking the included characteristics into account has been made.

Therefore, an object of the present invention is to provide a moving body positioning device capable of appropriately using the various information items of ionospheric conditions, and accurately estimating and correcting for the ionospheric error.

Means for Solving Problem

To achieve the above object, according to a first aspect of the present invention, there is provided a moving body positioning device including a first ionospheric state information receiving unit receiving information of a predicted ionospheric state at a time point later than a current time point; a second ionospheric state information receiving unit receiving information of an ionospheric state at the current time point; an ionospheric delay error estimating unit estimating an ionospheric delay error by correcting a first ionospheric delay error based on a second ionospheric delay error, the first ionospheric delay error being derived based on the first ionospheric state information, and the second ionospheric delay error being derived based on the second ionospheric state information; and a positioning unit locating a position of a moving body based on a received result of a radio wave from a satellite and the estimated ionospheric delay error.

According to a second aspect of the present invention, there is provided a moving body positioning device according to the first aspect of the present invention, in which the ionospheric delay error estimating unit estimates the ionospheric delay error in a manner so that averaging is performed by applying a weighting coefficient to each of the first ionospheric delay error derived based on the first ionospheric state information and the second ionospheric delay error derived based on the second ionospheric state information.

According to a third aspect of the present invention, there is provided a moving body positioning device according to the second aspect of the present invention, in which the weighting coefficient applied to the first ionospheric delay error varies depending on the elapsed time from when the first ionospheric state information is received, and a value of the weighting coefficient corresponding to a longer elapsed time is greater than a value of the weighting coefficient corresponding to a shorter elapsed time.

According to a fourth aspect of the present invention, there is provided a moving body positioning device according to any one of the first through third aspects of the present invention, in which the first ionospheric state information is GIM (Global Ionosphere Map) data, and the second ionosphere state information is an ionospheric correction coefficient included in a navigation message.

According to a fifth aspect of the present invention, there is provided a moving body positioning device according to the fourth aspect of the present invention, in which the first ionospheric state information receiving unit receives the GIM data from an external center.

According to a sixth aspect of the present invention, there is provided a moving body positioning device according to the fourth aspect of the present invention, in which the second ionospheric delay error is derived by applying the ionospheric correction coefficient to a Klobuchar model.

EFFECT OF THE INVENTION

According to an embodiment of the present invention, there is provided a moving body positioning device capable of appropriately using the various information items of the ionospheric conditions, and accurately estimating and correcting for the ionospheric error.

EXPLANATION OF LETTERS AND NUMERALS

1: GPS receiver
10: GPS satellite
20: receiving section
30: filter
40: positioning calculating section
50: ionospheric delay error estimating section
60: satellite position calculating section 70: communicating section
80: external center
90: vehicle

BEST MODE FOR CARRYING OUT THE INVENTION

In the following, a best mode for carrying out the present invention is described with reference to the drawings.

Figure 1:
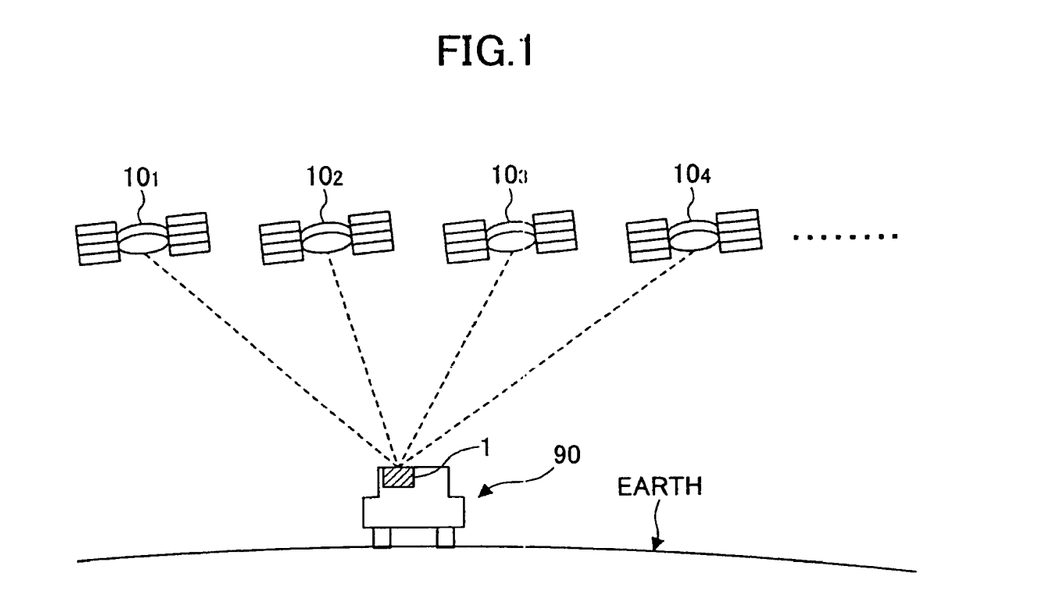
FIG. 1 is a system configuration diagram showing a whole configuration of a GPS employing a moving body positioning device according to an embodiment of the present invention.

FIG. 1 is a system configuration diagram showing a whole configuration of a GPS (Global Positioning System) employing a moving body positioning device according to an embodiment of the present invention. As shown in FIG. 1, the GPS includes GPS satellites 10 orbiting around the earth and a vehicle 90 positioned and movable on the earth. It should be noted that the vehicle 90 is merely an example of the moving bodies. The moving bodies include, but are not limited to, a two-wheel motor vehicle, a railroad car, a ship, a forklift, an automaton, and a cell phone movable in accordance with the movement cf the owner.

The GPS satellites 10 continuously broadcast a navigation message (a satellite signal) toward the earth. The navigation message includes satellite orbit information (ephemerides and almanac) of the corresponding GPS satellite 10, a clock correction value, and a correction coefficient of the ionospheric layer. The navigation message is spread by a C/A code, carried on an L1 wave (frequency: 1575.42 MHz), and continuously broadcasted toward the earth. It should be noted that the L1 wave is a composite wave of a sine wave modulated by the C/A code and a cosine wave modulated by a P code (Precision Code) and is orthogonally modulated. Each of the C/A code and the P code is a pseudo-noise code which is a code string containing "−1" and "1" each irregularly and periodically arranged.

It should be noted that, now, 24 GPS satellites orbit around the earth at an altitude of approximately 20,000 km and are arranged in six orbital planes inclined 55 degrees relative to each other so that 4 satellites are contained in each orbital plane. As a result, at least 5 GPS satellites 10 can be observed from any place on earth where the sky is open.

As a moving body position positioning device, a GPS receiver 1 is mounted on the vehicle 90. The GPS receiver 1 locates the position of the vehicle 90 based on satellite signals from the GPS satellites 10 as described below.

Figure 2:
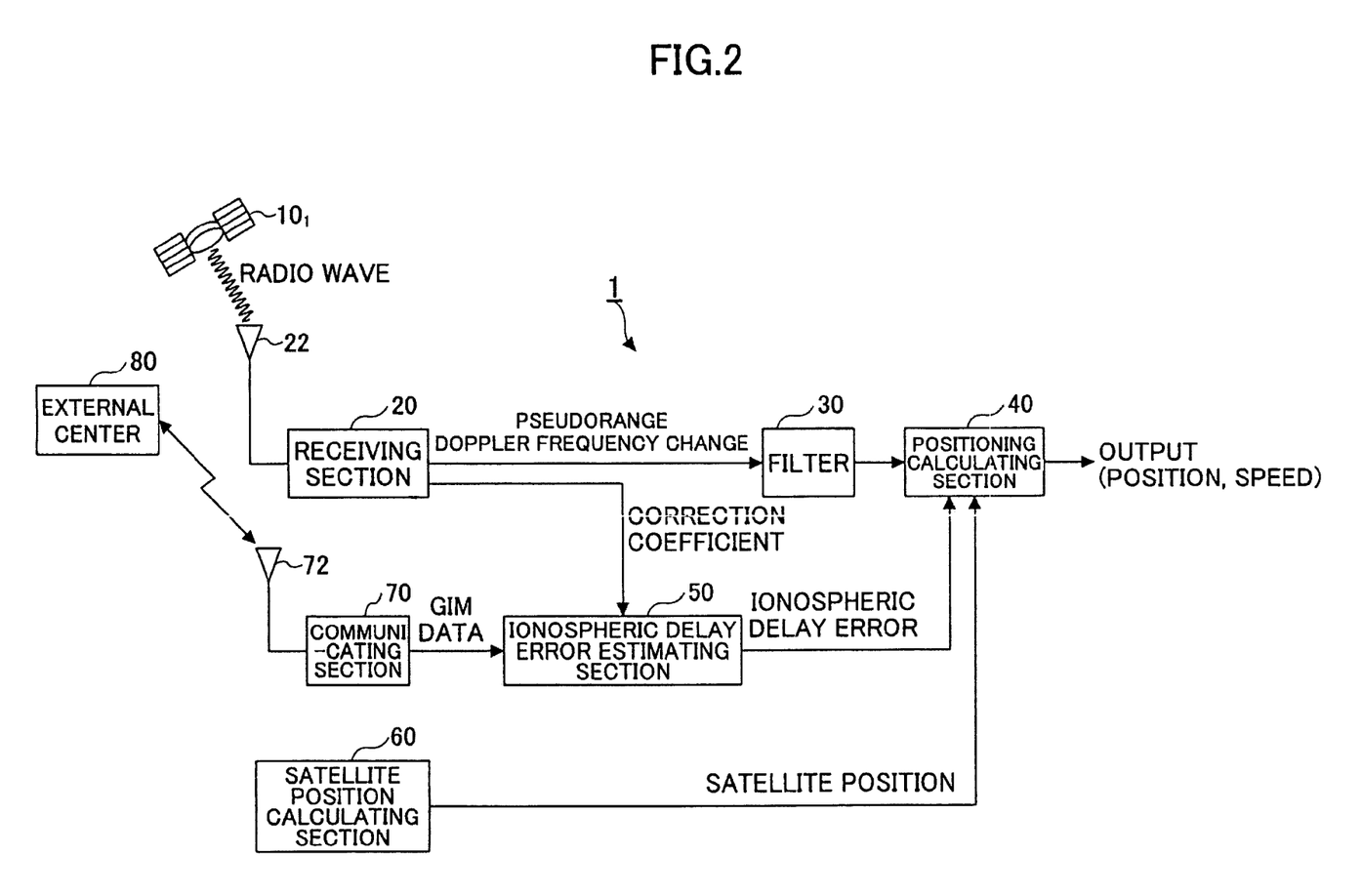
FIG. 2 is a system configuration diagram showing an embodiment of a GPS receiver 1 mounted on a vehicle 90 in FIG. 1.

FIG. 2 is a schematic system configuration diagram showing the GPS receiver 1 mounted on the vehicle 90 in FIG. 1 according to an embodiment of the present invention. In FIG. 2, only one GPS satellite $10_1$ (the subscript number represents a satellite number) is shown for illustrative purposes only. Herein, a signal processing of the satellite signal from the GPS satellite $10_1$ is selectively described. Namely, the signal processing of the satellite signal from the GPS satellite $10_1$ is substantially the same as that from any of the other GPS satellites such as GPS satellites $10_2$ and $10_3$. In practical signal processing of the satellite signals described below, the signal processing of satellite signals from each of the observable GPS satellites such as GPS satellites $10_1$, $10_2$, and $10_3$ is performed in parallel (simultaneously).

As shown in FIG. 2, the GPS receiver 1 in this embodiment includes, as main functional sections, a receiving section 20, a filter 30, a positioning calculating section 40, an ionospheric delay error estimating section 50, a satellite position calculating section 60, and a communicating section 70.

The receiving section 20 receives a satellite signal from the GPS satellite $10_1$ through a GPS antenna 22, performs a C/A code synchronization using an internally-generated replica C/A code, and extracts a navigation message. There may be various C/A code synchronization methods, and any appropriate method may be used. For example, a method of tracking a code phase where a peak correlation value of the replica C/A code with respect to the received C/A code is detected using DDL (Delay-Locked Loop). Whenever the navigation message is updated, the receiving section 20 supplies an ionospheric correction coefficient included in the navigation message to the ionospheric delay error estimating section 50.

Further, the receiving section 20 calculates a pseudorange "ρ'" between the GPS satellite $10_1$ and the vehicle 90 (accurately, the GPS receiver 1) based on a receiving result of the satellite signal from the GPS satellite $10_1$. Unlike a true range between the GPS satellite $10_1$ and the vehicle 90, the pseudorange "ρ'" includes clock bias and an error due to a variation in the radio wave propagation speed such as the ionospheric delay error. It should be noted that the symbol "'" added to the pseudorange "ρ" denotes that a filtering process described below is not yet performed.

Here, the pseudorange "ρ'" with respect to the GPS satellite $10_1$ may be calculated as follows:

$$\rho' = N \times 300$$

where, the value "N" corresponds to the number of bits of the C/A code between the GPS satellite $10_1$ and the vehicle 90 and is calculated based on a phase of the replica C/A code and a receiver's clock in the GPS receiver 1. It should be noted that the numerical value of "300" derives from a fact that one bit length of the C/A code is 1 μs and a length corresponding to the 1 bit is approximately 300 m (1 μs×light speed). A signal representing the thus-calculated pseudorange "ρ'" is input to the filter 30.

Further, the receiving section 20 measures a carrier wave phase of the satellite signal and Doppler frequency change "Δf" of a Doppler-shifted received carrier wave using an internally-generated replica carrier. The Doppler frequency change "Δf" is measured as the difference (=fr−$f_c$) between a replica carrier frequency "fr" and a known carrier frequency "$f_c$" (1575.72 MHz). This function may be realized by PLL (Phase-Locked Loop) for calculating a correlation value using the replica carrier and tracking the receiving carrier. A signal representing the Doppler frequency change "Δf" is input to the filter 30.

The filter 30 performs a filtering process with respect to the pseudorange "ρ'" using the Doppler frequency change "Δf". In the filter 30, the pseudorange "ρ" is derived after the filtering process using, for example, the following equation.

$$\rho(i) = \frac{\rho'(i) + (M+1) \times \left\{ \rho(i-1) + \int \Delta V \cdot dt \right\}}{M} \qquad \text{[EXPRESSION 1]}$$

Here, symbols "(i)" and "(i−1)" denote a present value and a previous value, respectively. The symbol "M" denotes a weighting coefficient. The value of "M" is appropriately determined by considering the accuracy and the responsiveness. The symbol "ΔV" denotes a relative speed between the GPS satellite $10_1$ and the vehicle 90 calculated by, for example, the following equation using the measured Doppler frequency change "Δf".

$$\Delta f = \Delta V \cdot f_c / (c - \Delta V)$$

Where, the symbol "c" denotes the speed of light. It should be noted that a filtering (smoothing) process in the filter 30 may also be realized by using a filter, other than the Hatch filter shown in above Expression 1, such as a Kalman filter. A signal representing the pseudorange "ρ" after the filtering process is input to the positioning calculating section 40.

Figure 3:
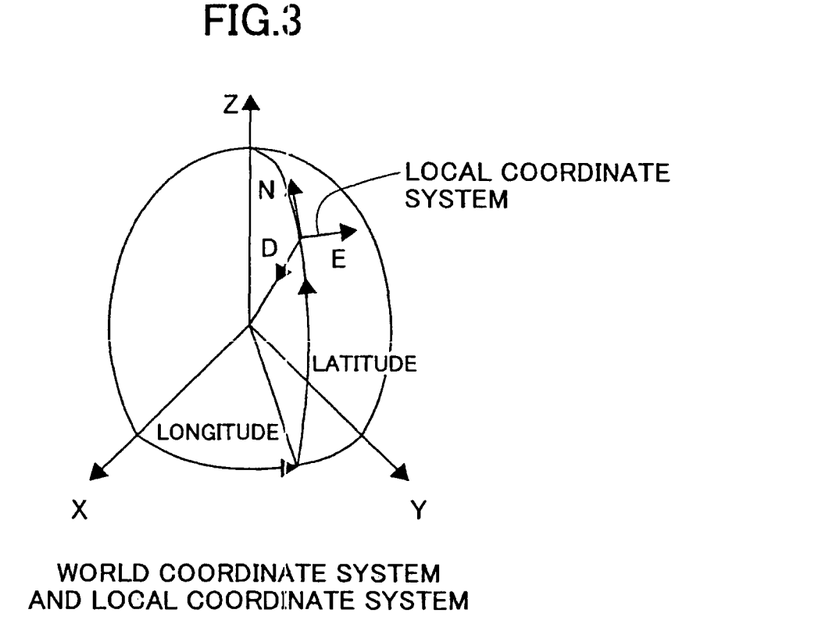
FIG. 3 is a drawing showing relationships between a world coordinate system and a local coordinate system.

The satellite position calculating section 60 calculates a current position $(X_1, Y_1, Z_1)$ of the GPS satellite $10_1$ in a global coordinate system based on satellite orbit information and the current time in the navigation message. It should be noted that since the GPS satellite $10_1$ is one of the artificial satellites, the motion of the GPS satellite $10_1$ is assumed to be within a certain plane (orbital plane) including the earth's gravitational center. Otherwise, the motion (orbit) of the GPS satellite $10_1$ is assumed to be within an ellipse where the earth's center of gravity is one of the foci. Therefore, by performing numerical calculations based on Kepler's equation, the position of the GPS satellite $10_1$ within the orbital plane can be calculated. Further, the position $(X_1, Y_1, Z_1)$ of the GPS satellite $10_1$ can be obtained by performing a three-dimensional rotational coordinate conversion from the position of the GPS satellite $10_1$ in the orbital plane by considering rotationally convertible relationships between the world coordinate system and the local coordinate system. It should be noted that, as shown in FIG. 3, the world coordinate system is defined as a coordinate system having as the point of origin the earth's gravitational center, X and Y axes orthogonal to each other disposed in the equatorial plane and a Z axis orthogonal to each of the X and Y axes. A signal representing the satellite position $(X_1, Y_1, Z_1)$ is input to the positioning calculating section 40.

The communicating section 70 obtains global ionospheric distribution data, namely GIM (Global Ionosphere Map) data, from an external center 80 through an antenna 72. The GIM data are available from the University of Bern through the Internet. The GIM data include predicted ionospheric distribution data after a certain period of time (after one day) based on past ionospheric distribution data and ionospheric distribution data measured before. However, it is assumed that predicted ionospheric distribution data after a certain period of time are herein used. In this case, the communicating section 70 obtains the latest GIM data when, for example, the GPS receiver 1 is booted, and then may be operated so as to obtain the latest GIM data whenever the latest GIM data are updated (whenever the above certain period of time has elapsed) as long as the GPS receiver 1 continuously operates. The GIM data obtained by the communicating section 70 are supplied to the ionospheric delay error estimating section 50.

The ionospheric delay error estimating section 50 estimates the ionospheric delay error "ΔI" based on the GIM data from the communicating section 70 and the ionospheric correction coefficient from the receiving section 20. The ionospheric delay error "ΔI" is caused by the change of the propagation speed of a radio wave due to a refraction index applied when the radio wave passes through the ionospheric layer. It is known that generally, the ionospheric delay error "ΔI" is proportional to a Total Electron Content (TEC) on the propagation path and is inversely proportional to the square of the carrier wave frequency.

Specifically, an ionospheric delay error estimation method may be realized as follows.

First, the ionospheric delay error estimating section 50 estimates the ionospheric delay error based on the GIM data. In the following, the thus-obtained ionospheric delay error based on the GIM data is called "first ionospheric delay error $\Delta I_1$". The first ionospheric delay error "$\Delta I_1$" is highly accurate but has a characteristic that the reliability is degraded as time passes because of long update intervals of the GIM data (for example, once a day).

On the other hand, the ionospheric delay error estimating section 50 estimates a vertical delay amount at a positioning point (position of the vehicle 90) by applying the ionospheric correction coefficient to a previously provided ionospheric model (typically a Klobuchar model). Next, the ionospheric delay error estimating section 50 derives a delay amount in the slant-range direction (corresponding to the ionospheric delay error) by considering the elevation angle of the GPS satellite $10_1$ (satellite elevation angle) with respect to the vertical delay amount. In the following, the ionospheric delay error estimated based on the ionospheric correction coefficient from the receiving section 20 is called "second ionospheric delay error $\Delta I_2$". The accuracy of the second ionospheric delay error "$\Delta I_2$" is less than that of the first ionospheric delay error "$\Delta I_1$" but the second ionospheric delay error "$\Delta I_2$" has a characteristic of having an excellent real-time property because the ionospheric correction coefficient generated based on a current status of the ionospheric layer is included in the navigation message. It should be noted that the Klobuchar model is described in, for example, J. Klobuchar "Design and characteristics of the GPS ionospheric time delay algorithm for single frequency users", Proc. Position Location and Navigation Symposium, 1986", but any modified model based on this model may also be used.

The ionospheric delay error estimating section 50 estimates the ionospheric delay error "ΔI" by integrating the first ionospheric delay error "$\Delta I_1$" and the second ionospheric delay error "$\Delta I_2$" derived from models independent of each other as described above. This integration may be realized based on, for example, the following formula.

$$\Delta I = \alpha \cdot \Delta I_1 + (1-\alpha) \cdot \Delta I_2$$

Here, the symbol "α" denotes a weighting coefficient and satisfies the following relationship.

$$|\alpha| < 1$$

The "α" may be a fixed value. However preferably, it is thought that the "α" is a variable value varying depending on time. Specifically, the "α" may be represented by, for example, the following equation.

$$\alpha = 1 - t/\Delta T \quad \text{Formula (1)}$$

Figure 4:
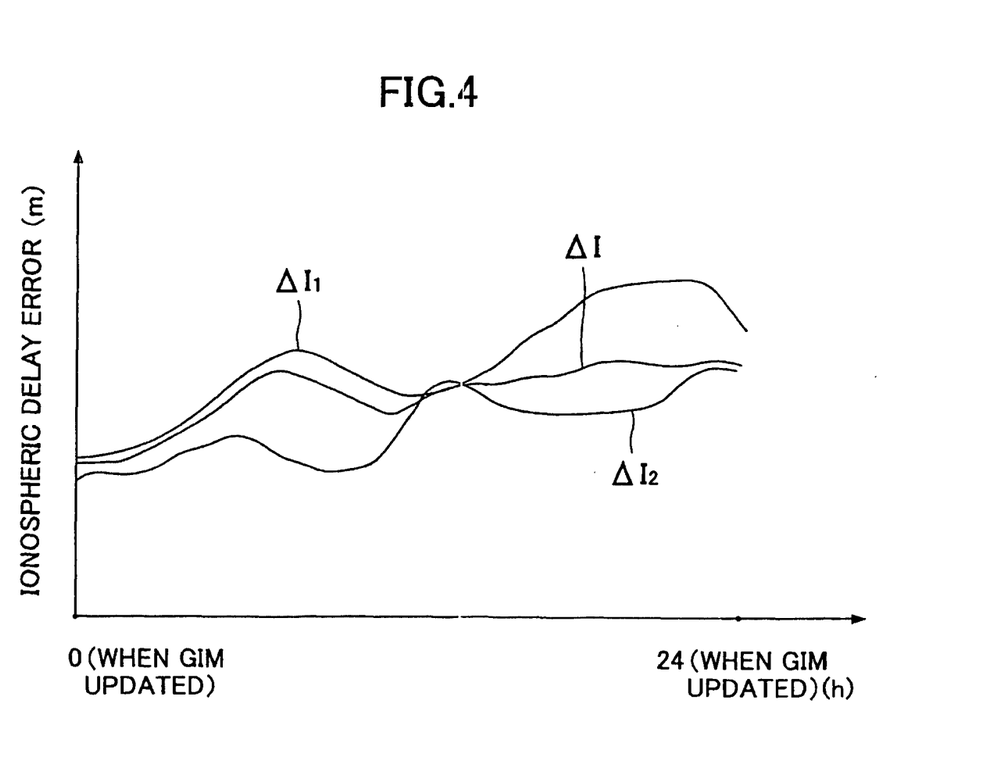
FIG. 4 is a drawing conceptually showing relationships between a first ionospheric delay error "$\Delta I_1$", a second ionospheric delay error "$\Delta I_2$", and an ionospheric delay error "$\Delta I$"

The symbols "ΔT" and "t" denote an update interval (one day in this example) of the GIM data and an elapsed time from the latest update of the GIM data until a current time point, respectively. Therefore, as conceptually shown in FIG. 4, as the elapsed time from the latest update of the GIM data until the current time point increases, the weighting with respect to the first ionospheric delay error "$\Delta I_1$" is reduced and the weighting with respect to the second ionospheric delay error "$\Delta I_2$" is increased. This is due to the consideration that the update interval of the GIM data is long and the reliability of the first ionospheric delay error "$\Delta I_1$" is degraded as time passes from the update but the reliability of the second ionospheric delay error "$\Delta I_2$" is hardly degraded as time passes because of depending on real-time information. It should be noted that in the Formula (1), the "α" continuously decreases as time passes from the latest update of the GIM data until now. However, any Formula where the "α" discontinuously decreases as time passes from the latest update of the GIM data until the current time point may also be used. A signal representing the thus-derived ionospheric delay error "ΔI" is input to the positioning calculating section 40.

The positioning calculating section 40 locates a position $(X_u, Y_u, Z_u)$ of the vehicle 90 based on the calculation result of the satellite position, the ionospheric delay error "ΔI", and the pseudorange "ρ" from the receiving section 20. Specifically, the following equation may be used.

$$\rho = \sqrt{\{(X_1-X_u)^2+(Y_1-Y_u)^2+(Z_1-Z_u)^2\}} + w + \Delta I \quad \text{Formula (2)}$$

The symbol "w" denotes an error (mainly clock bias) other than the ionospheric delay error "ΔI". It should be noted that this Formula is for the GPS satellite $10_1$. However, the same equation may also be applied to the other observable satellites 10. The position of the vehicle 90 may be derived by assigning each ionospheric delay error "ΔI" estimated as described above with respect to the corresponding three GPS satellites 10 to the "ΔI" in Formula (2) of the corresponding three GPS satellites 10 and using each pseudorange "ρ" and each satellite position obtained with respect to the corresponding three GPS satellites 10 and the principle of triangulation. In this case, as described above, the pseudorange "ρ" includes the clock bias, which is removed by using the pseudorange "ρ", the ionospheric delay error "ΔI", and the satellite position each obtained with respect to a fourth GPS satellite 10.

A positioning interval by the positioning calculating section 40 may be, for example, an observation interval (for example, 1 ms) or a prescribed observation interval (for example, 50 ms or 100 ms). A positioning result is supplied to, for example, a navigation system (not shown).

Next, the usefulness of an ionospheric delay error estimation method according to the above described embodiment of the present invention is described with reference to conceptual drawings.

Figure 5A:
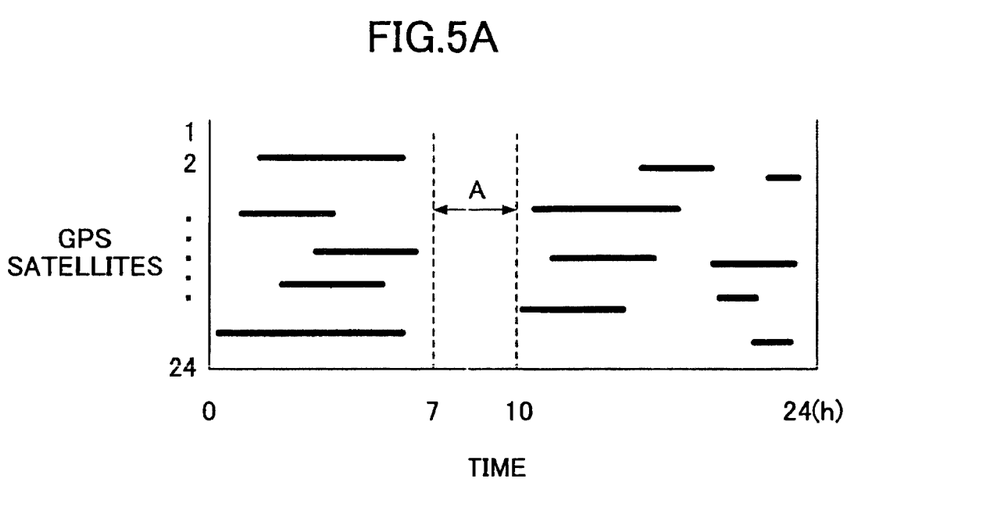
FIG. 5A is a drawing conceptually showing availability of GPS satellites 10 in a conventional positioning method.
Figure 5B:
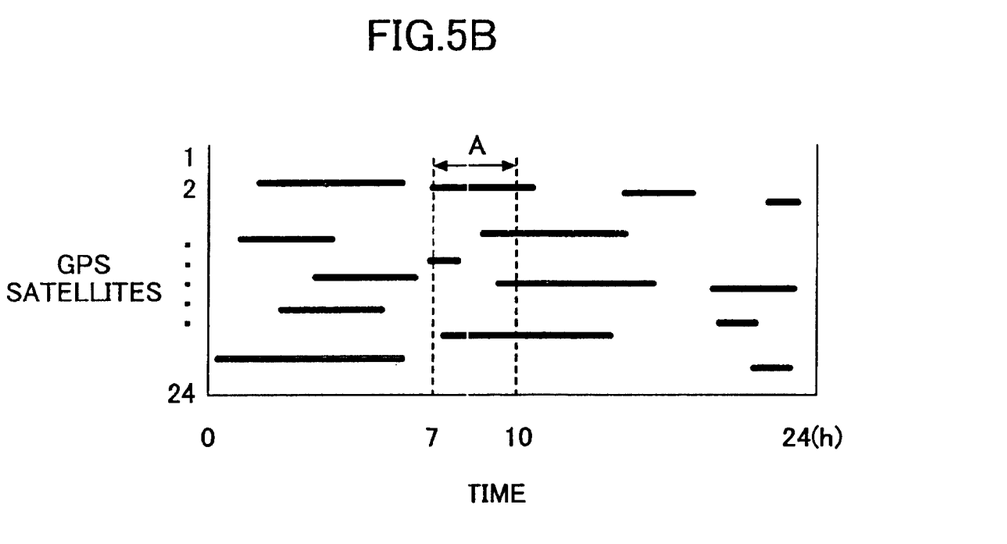
FIG. 5B is a drawing conceptually showing availability of GPS satellites 10 in a positioning method according to an embodiment of the present invention.

FIG. 5A shows the availability of the GPS satellites 10 when a conventional positioning method is used. FIG. 5B shows the availability of the GPS satellites 10 when a positioning method according to an embodiment of the present invention is used. In FIGS. 5A and 5B, sections where lines are drawn denote where the GPS satellite 10 is available for the positioning calculation.

In a case of the conventional method (without using GIM data), as shown in FIG. 5A, many GPS satellites 10 are at low elevation angles in a section "A" (three hours from 7 to 10) and are not available due to being masked by the low elevation angle.

On the other hand, according to the embodiment of the present invention, as shown in FIG. 5B, many GPS satellites 10 are at low elevation angles in the section "A", but a positioning process can be performed by using the satellite signal from the GPS satellites 10 at low elevation angles. This means that since the ionospheric delay error can be estimated and corrected using the GIM data, highly accurate positioning information can be maintained even when the elevation angles is low where the ionospheric delay error becomes larger.

Figure 6A:
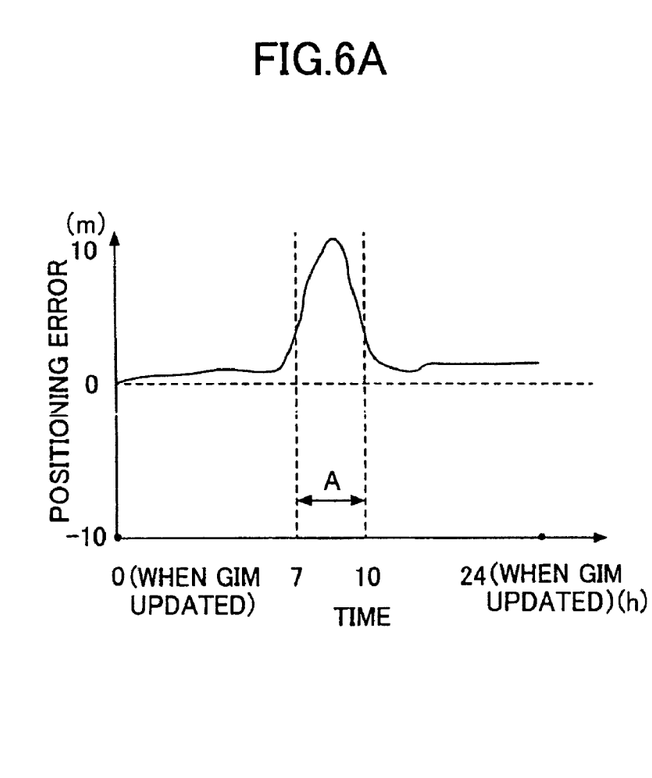
FIG. 6A is a drawing showing a positioning accuracy in a conventional positioning method.
Figure 6B:
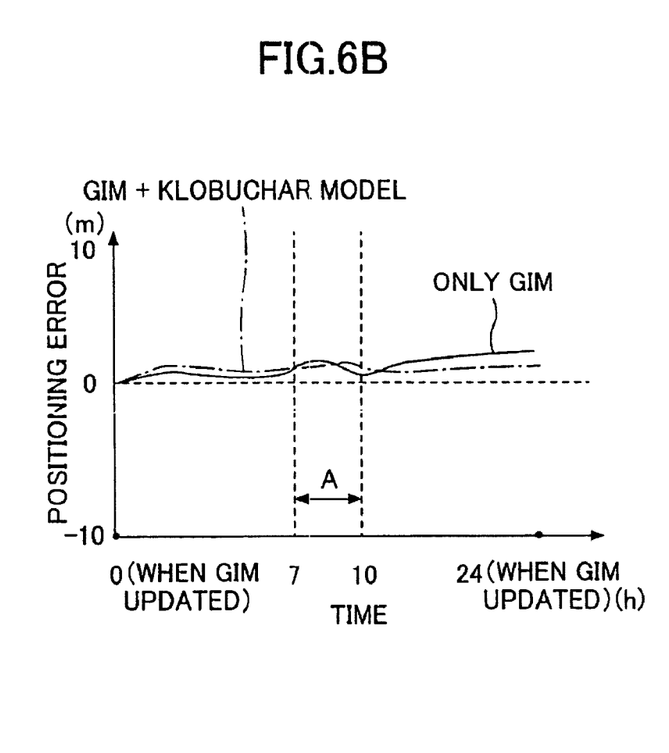
FIG. 6B is a drawing showing a positioning accuracy in a positioning method according to an embodiment of the present invention.

FIG. 6A shows a positioning accuracy when a conventional positioning method is used. FIG. 6B shows a positioning accuracy when a positioning method according to an embodiment of the present invention is used. In FIG. 6B, as reference, a curve line showing the positioning accuracy upon using the GIM data only is drawn as a solid line. The other curve line drawn as a dash-dot line shows the positioning accuracy upon estimating ionospheric delay error "ΔI" from the first ionospheric delay error "$ΔI_1$" and the second ionospheric delay error "$ΔI_2$" (namely, both the GIM model and the Klobuchar model are used) according to an embodiment of the present invention as described above.

In a case of the conventional method (without using GIM data) as shown in FIG. 6A, the positioning accuracy in the section "A" in FIG. 5A is largely degraded because of unusable GPS satellites 10 at low elevation angles.

Further, when the ionospheric delay error is estimated based on the GIM data, as shown in the solid line in FIG. 6B, highly accurate positioning information can be maintained because the GPS satellites 10 at low elevation angles can be used. However, in this case, as shown by the solid line in FIG. 6B, the positioning accuracy is degrated to some extent after time has passed from the latest update of the GIM data (position at "0" scale on the horizontal axis) (see, for example, a section after 10 hours or longer has passed) because of the degradation of the reliability of the GIM data.

On the other hand, in a case of the embodiment of the present invention, the ionospheric delay is estimated based on the GIM data. Therefore, as shown in the curve in the dash-dot line in FIG. 6B, highly accurate positioning information can be maintained because the GPS satellites 10 even at low elevation angles in the section "A" can be used. Further, even after time has passed from the latest update of the GIM data (position at "0" scale on the horizontal axis) (see, for example, a section after 10 hours or more has passed), by using both the first ionospheric delay error "$ΔI_1$" and the second ionospheric delay error "$ΔI_2$" (most preferably, by increasing the weighing with respect to the second ionospheric delay error "$ΔI_2$" as time passes), the degradation of the positioning accuracy due to the degradation of the reliability of the GIM data over time is better controlled.

As described above, according to an embodiment of the present invention, especially the following excellent advantages may be obtained.

As described above, by effectively using the advantages of the GIM data and the Klobuchar model at the same time, while highly accurate positioning information using the GPS satellites 10 at low elevation angle is being maintained, the degradation of the positioning accuracy that may have occurred after a long time has passed since updating the GIM data is better controlled.

A preferred embodiment of the present invention is described above. However, the present invention is not limited to the embodiment described above. It should be understood that various modifications and substitutions may be made without departing from the scope of the present invention.

For example, when the GPS receiver 1 is a two-frequency receiver capable of receiving both L1 wave and L2 wave, the ionospheric delay error may be estimated by using the ionospheric model with the two-frequency data.

Further, in the above embodiment, two appropriate ionospheric models (GIM and Klobuchar models) based on the current GPS status are used. However, in the future when ionospheric models each having the same characteristics are available, it becomes possible to alternatively use those ionospheric models in the same manner as described above. Still further, any ionospheric model as a modification and substitution of the GIM or the Klobuchar model may also be used.

Further, in the above embodiment, the GIM data obtained by the external center 80 through the Internet are transferred to the vehicle 90. However any other configuration may also be used. For example, the GIM data obtained by a road-side facility through the Internet may be transferred to the vehicle 90 through road-to-vehicle communications, or the communicating section 70 itself of the vehicle 90 may directly access the Internet by wireless communications to directly obtain the GIM data.

The present application claims priority from Japanese Patent Application No. 2006-333675 filed on Dec. 11, 2006, the entire contents of which are hereby incorporated herein by reference.

The invention claimed is:
1. A moving body positioning device comprising:
a first ionospheric state information receiving unit receiving information of a predicted ionospheric state at a time point later than a current time point;

a second ionospheric state information receiving unit receiving information of an ionospheric state at the current time point;

an ionospheric delay error estimating unit estimating an ionospheric delay error by correcting a first ionospheric delay error based on a second ionospheric delay error, the first ionospheric delay error being derived based on the first ionospheric state information, and the second ionospheric delay error being derived based on the second ionospheric state information; and a positioning unit locating a position of a moving body based on a received result of a radio wave from a satellite and the estimated ionospheric delay error, wherein the estimated ionospheric delay error includes a vertical delay amount at a positioning point of the moving body and a delay amount in a slant-range direction based on an elevation angle of a satellite with respect to the vertical delay amount.

2. The moving body positioning device according to claim 1, wherein the ionospheric delay error estimating unit estimates the ionospheric delay error in a manner so that averaging is performed by applying a weighting coefficient to each of the first ionospheric delay error derived based on the first ionospheric state information and the second ionospheric delay error derived based on the second ionospheric state information.

3. The moving body positioning device according to claim 2, wherein the weighting coefficient applied to the first ionospheric delay error varies depending on an elapsed time from when the first ionospheric state information is received, and a value of the weighting coefficient corresponding to a longer elapsed time is greater than a value of the weighting coefficient corresponding to a shorter elapsed time.

4. The moving body positioning device according to claim 1, wherein the second ionospheric state information receiving unit receives a satellite signal from a GPS satellite.

5. A moving body positioning device comprising:

a first ionospheric state information receiving unit receiving information of a predicted ionospheric state at a time point later than a current time point;

a second ionospheric state information receiving unit receiving information of an ionospheric state at the current time point;

an ionospheric delay error estimating unit estimating an ionospheric delay error by correcting a first ionospheric delay error based on a second ionospheric delay error, the first ionospheric delay error being derived based on the first ionospheric state information, and the second ionospheric delay error being derived based on the second ionospheric state information; and a positioning unit locating a position of a moving body based on a received result of a radio wave from a satellite and the estimated ionospheric delay error, wherein the first ionospheric state information is GIM (Global Ionosphere Map) data, and the second ionosphere state information is an ionospheric correction coefficient included in a navigation message.

6. The moving body positioning device according to claim 5, wherein the first ionospheric state information receiving unit receives the GIM data from an external center.

7. The moving body positioning device according to claim 5, wherein the second ionospheric delay error is derived by applying the ionospheric correction coefficient to a Klobuchar model.

* * * * *